(12) United States Patent
Cheong et al.

(10) Patent No.: US 10,475,031 B2
(45) Date of Patent: Nov. 12, 2019

(54) CONDUCTING SECURE RETAIL TRANSACTIONS USING A MOBILE WALLET SYSTEM

(71) Applicant: Target Brands, Inc., Minneapolis, MN (US)

(72) Inventors: Kevin Mun Weng Cheong, Plymouth, MN (US); Andrew Wind, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 400 days.

(21) Appl. No.: 15/379,249

(22) Filed: Dec. 14, 2016

(65) Prior Publication Data

US 2018/0165669 A1    Jun. 14, 2018

(51) Int. Cl.
*G06Q 20/40* (2012.01)
*G06Q 20/32* (2012.01)
*G06Q 20/20* (2012.01)
*G06Q 20/36* (2012.01)

(52) U.S. Cl.
CPC ....... *G06Q 20/4012* (2013.01); *G06Q 20/204* (2013.01); *G06Q 20/3223* (2013.01); *G06Q 20/3274* (2013.01); *G06Q 20/36* (2013.01); *G06Q 20/367* (2013.01); *G06Q 2220/00* (2013.01)

(58) Field of Classification Search
CPC ............. G06Q 20/4012; G06Q 20/204; G06Q 20/3223; G06Q 20/3274; G06Q 20/36; G06Q 20/367

USPC ................................................. 235/380, 379
See application file for complete search history.

(56) References Cited

U.S. PATENT DOCUMENTS

| | | | |
|---|---|---|---|
| 8,380,177 B2 | 2/2013 | Laracey | |
| 8,600,883 B2 | 12/2013 | Wong | |
| 8,632,000 B2 | 1/2014 | Laracey | |
| 8,774,781 B1 | 7/2014 | Speiser et al. | |
| 9,047,385 B1 | 6/2015 | Malkin et al. | |
| 9,147,191 B2 | 9/2015 | Cohen et al. | |
| 9,189,785 B2 * | 11/2015 | Liberty | G06Q 20/26 |
| 9,208,482 B2 | 12/2015 | Laracey | |
| 9,218,601 B2 | 12/2015 | Jamkhedkar et al. | |
| 9,269,083 B1 * | 2/2016 | Jarajapu | G06Q 20/105 |
| 9,280,689 B2 | 3/2016 | Ling | |
| 2010/0138344 A1 * | 6/2010 | Wong | G06Q 20/10 705/44 |

(Continued)

FOREIGN PATENT DOCUMENTS

WO     WO 2015/167671     11/2015

OTHER PUBLICATIONS

Johnson, Melissa, MerchantMaverick, The Ultimate Guide to Accepting Mobile Payments, https://www.merchantmaverick.com/ultimate-guide-accepting-mobile-payments/, website pages, Sep. 24, 2015, 22 pp.

(Continued)

*Primary Examiner* — Paultep Savusdiphol
(74) *Attorney, Agent, or Firm* — Nixon & Vanderhye P.C.

(57) ABSTRACT

A mobile payment system for a retail environment enables customers to securely use their mobile device to pay for goods purchased at a point-of-sale (POS) system, regardless of whether the mobile device has cellular service or is connected to a network.

20 Claims, 4 Drawing Sheets

(56) References Cited

U.S. PATENT DOCUMENTS

| | | | | |
|---|---|---|---|---|
| 2012/0209749 | A1* | 8/2012 | Hammad | G06Q 30/06 |
| | | | | 705/27.1 |
| 2012/0267432 | A1* | 10/2012 | Kuttuva | G06Q 20/223 |
| | | | | 235/379 |
| 2013/0240622 | A1* | 9/2013 | Zhou | G06Q 20/105 |
| | | | | 235/379 |
| 2014/0054369 | A1* | 2/2014 | Liberty | G06Q 20/26 |
| | | | | 235/379 |
| 2014/0101036 | A1* | 4/2014 | Phillips | G06Q 20/027 |
| | | | | 705/39 |
| 2014/0337138 | A1 | 11/2014 | Chitalia et al. | |
| 2014/0337230 | A1 | 11/2014 | Bacastow | |
| 2014/0349692 | A1* | 11/2014 | Zhou | G06Q 20/3829 |
| | | | | 455/466 |
| 2015/0006386 | A1* | 1/2015 | Tebbe | G06Q 20/3274 |
| | | | | 705/44 |
| 2016/0005022 | A1* | 1/2016 | Liberty | G06Q 20/26 |
| | | | | 705/21 |
| 2016/0019528 | A1 | 1/2016 | Hong | |

OTHER PUBLICATIONS

Voo, Brian, in Mobile, Digital Wallets—10 Mobile Payment Systems to Take You There, http://www.hongkiat.com/blog/digital-wallets/, website pages, 2016, 13 pp.

* cited by examiner

CONDUCTING SECURE RETAIL TRANSACTIONS USING A MOBILE WALLET SYSTEM

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to a retail payment system and, more particularly, to a secure mobile payment system for use in a retail environment regardless of an Internet or cellular network connection.

Existing mobile payment systems/applications typically require a mobile device with an active cellular network connection or Internet connection. These existing applications may require a passcode or application PIN before linking to a network server, and once connected, the network server provides information or a display such as a barcode or the like for processing at a point-of-sale (POS) terminal. Once identified, the mobile device communicates with a network server to complete the transaction based on preset payment parameters.

The discussion above is merely provided for general background information and is not intended to be used as an aid in determining the scope of the claimed subject matter. The claimed subject matter is not limited to implementations that solve any or all disadvantages noted in the Background.

SUMMARY

A mobile payment system for a retail environment enables customers to use their mobile device(s) to pay for goods purchased at a POS system. The system is premised at least partly on information being passed from an application device to a point-of-sale (POS) POS device. A customer first registers with the provider server, inputting pertinent biographic information and establishing login information. The customer also identifies at least one payment mechanism, e.g., a debit card, and also inputs a PIN or access code for the payment mechanism.

The customer downloads a mobile wallet application to their mobile device. When it is desired to make a purchase using the mobile wallet application, the user selects a link within the application. At that time, the application generates a barcode and displays the barcode on the device screen. The barcode is scanned at the POS terminal. The barcode identifies the customer and enables the POS terminal or payment provider to access the pre-stored payment mechanism associated with the customer. In some embodiments, the barcode can be generated and the payment can be processed without requiring the device to have cell service or be connected to the Internet.

The system of the described embodiments relates at least partly to the secure nature of both the online and offline barcodes, and in particular the automatic step up/switch in security needed when the offline barcode is detected. The additional step up in security is supported by cards that have a PIN. For purposes of the present description, the following definitions are applicable:

Card PIN—the personal identification number (PIN) that is associated with the user's payment card (e.g., the user's debit/ATM card). The card PIN solidifies that the user of the card is the true owner of the card.

App PIN—the PIN number that is associated with the mobile wallet application.

Passcode—the PIN number that is associated with the user's phone. In some cases, the passcode can be used to unlock data that is stored securely in the phone. Newer technology may also utilize a fingerprint identification to unlock the user's phone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
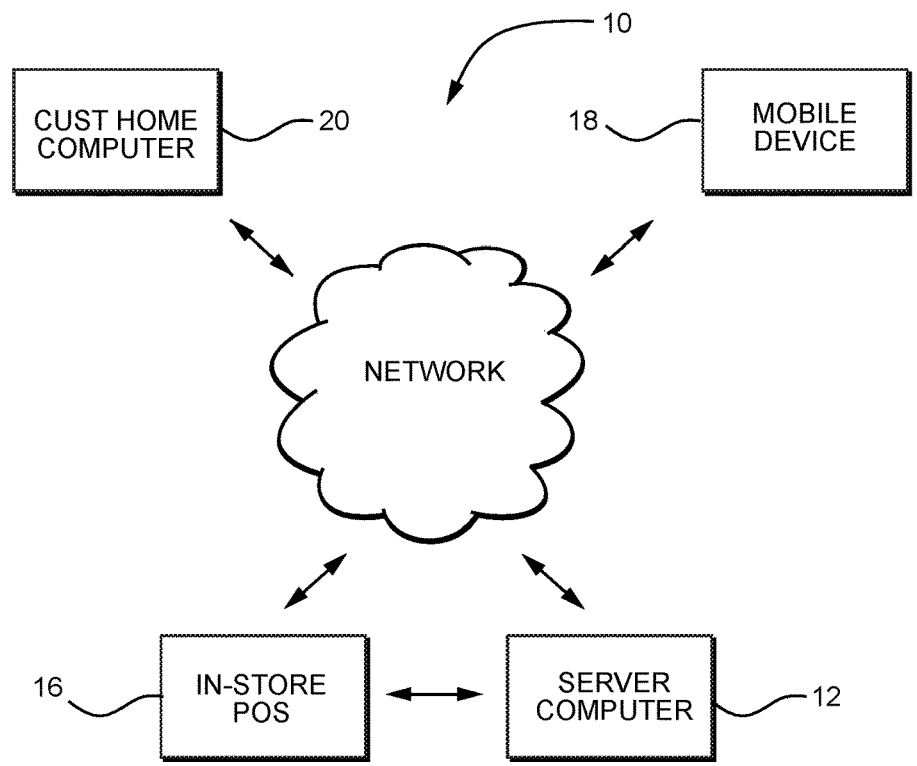
FIG. 1 is a schematic illustration of the mobile wallet system.

FIG. 1 is an exemplary representation of the mobile wallet system 10 for conducting secure retail transactions and the like using a mobile device. The system 10 includes a server computer 12 that runs a server program. In some embodiments, the server computer 12 includes network communication hardware (discussed in more detail below) to access a global computer network 14 such as the Internet. A retail store typically includes a plurality of in-store point-of-sale (POS) terminals 16 for processing items for customer purchase. The POS terminals 16 may communicate directly with the computer server 12 or may communicate with the server 12 via the network 14. The mobile wallet system 10 may be accessible through a mobile wallet application resident on a user mobile device 18. The user mobile device 18 may similarly be connected with the network 14 via a cellular network or a Wi-Fi connection. In some embodiments, account generation and maintenance may be performed using a user/customer home computer 20, which may be connected with the network 14 using known computer hardware and protocols as discussed in more detail below.

Figure 2:
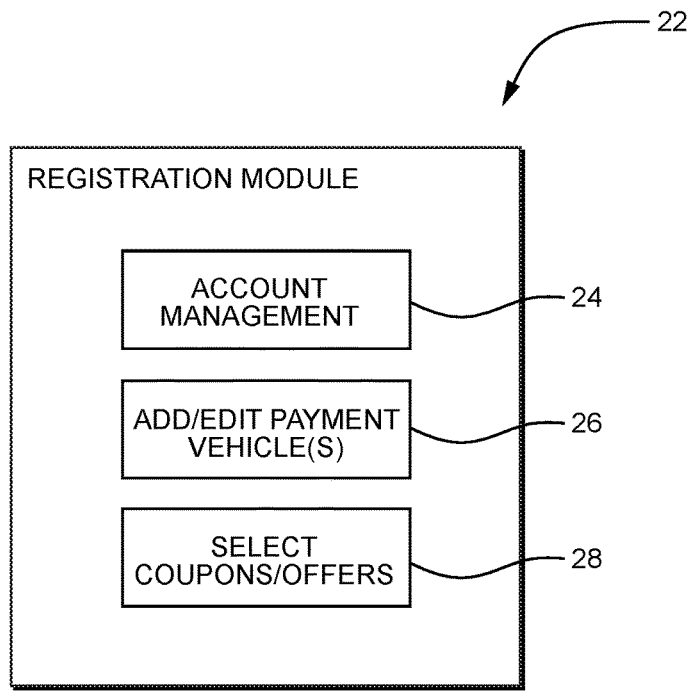
FIG. 2 is a schematic illustration of a registration module.

With reference to FIG. 2, an Account or Registration Module 22 resides on the server computer 12 and defines parameters for a mobile wallet account. In an Account Management component 24, customers can set up new accounts and/or modify parameters of existing accounts. Exemplary actions under the Account Management component 24 include establishing a username and password to open/access the mobile wallet account, inputting personal and contact information, defining preferences such as preferred payment sources, email preferences, and the like.

A Payment Vehicle section 26 enables users to add or edit payment vehicles associated with the mobile wallet system. For example, if it is the user's preference to use a debit card for mobile wallet purchases, the debit card information may be stored as part of the Payment Vehicle section 26. The payment information is not stored on the user's mobile device, but rather is associated with the mobile wallet account and stored securely on the server computer 12. In accordance with certain functional aspects of the mobile wallet system, it is desirable for the user to input a Card PIN associated with the debit/credit card to facilitate use of the mobile wallet application. That is, the user may be prompted to input the PIN code from the card provider for security purposes when using the mobile wallet application in a retail store environment.

A Coupons/Offers section 28 provides loyalty rewards and other offers according to an existing loyalty program. Users can access available coupons or offers through the mobile wallet account for subsequent use with the mobile wallet application while shopping.

Figure 3:
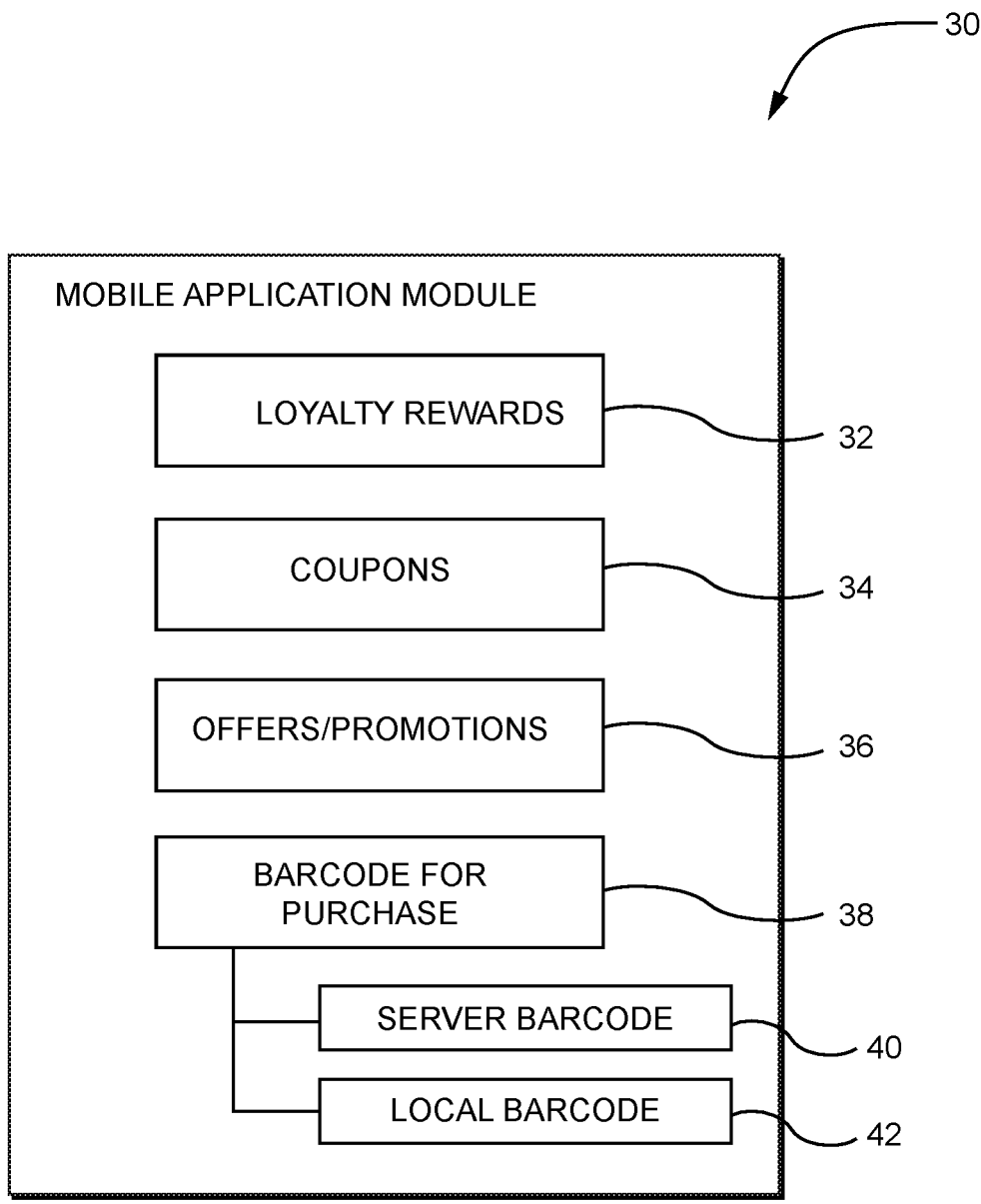
FIG. 3 is a schematic illustration of a mobile application module.

With reference to FIG. 3, an Application Module 30 resides on the server computer 12 and defines a mobile wallet application for download to the user mobile device 18. The server computer 12 links the mobile wallet application with the mobile wallet account set up and managed by the user via the Account Module 22 (FIG. 2). In some embodiments, the mobile wallet application may incorporate features such as Loyalty Rewards 32, Coupons 34 and Offers/Promotions 36 for mobile application users. The user may opt to utilize the features of the mobile wallet application for purchase discounts, sale items, promotional products and the like. In some embodiments, in order to link the mobile wallet application with the user's mobile wallet account, the user may be prompted to input the username and login information used to set up the mobile wallet account through the Account Module 22.

The mobile wallet application also includes a Barcode Component 38 that is configured to generate a barcode in response to the user selecting a link within the application. During or immediately after the customer's items for purchase have been processed at the POS terminal, the customer selects the link within the mobile wallet application, and the mobile wallet application generates a barcode and displays the barcode on a display of the mobile device 18. Generally, the barcode serves to identify the customer and enables the POS terminal 16 to access the pre-stored payment vehicle associated with the customer. In this manner, the payment information is not stored on the user's mobile device.

In some embodiments, when the mobile device 18 is connected with the network 14, the mobile wallet application requests a token or nonce from the server 12, and the server generates a server barcode 40 for the application to display on the mobile device. With access to the server 12 due to the mobile device connection through the network 14, the server can validate the user identity and access the appropriate mobile wallet account based on information from the mobile wallet application and the user's mobile device. There are various known ways to authenticate a user, and the present invention is not meant to be limited to any particular authentication methodology. In an exemplary application, the server can utilize built-in security protocols associated with the mobile device such as, for example touch ID or a device unlock passcode or the like. Once the user is authenticated, the server sends the token/nonce so that the mobile device is able to generate the server barcode 40. The server barcode includes information for the POS terminal to proceed with the transaction. Parameters and rules are established such that the server and local barcode are only viable for a preset period of time, such as three minutes or the like, and the server and local barcode can only be used once. If an internet connection is present (e.g., via Wi-Fi or the like), once the server computer issues the token/nonce, any previously-generated token will be invalid. The newly-generated server token/nonce is stored on the server computer for validation after the POS terminal scan. The POS terminal scans the barcode displayed by the mobile device, and a backend server utilizes the information in the barcode to access the payment vehicle identified in the customer's corresponding mobile wallet account. The preferred or pre-defined payment vehicle is used by the POS terminal and server or other payment processor to complete the transaction.

In some embodiments, the mobile wallet application can generate a local barcode 42 when the mobile device is not connected to a network. For example, the mobile device may be without cellular service or a Wi-Fi connection. Despite a lack of any connection to the server computer, the customer can still access the mobile wallet application to complete the transaction.

The local barcode 42 generated by the mobile wallet application may be concatenated from a plurality of data inputs that are used to create a hash. Exemplary inputs may include a guest identifier; a shared secret; a Unix timestamp; a device ID; etc.

Figure 4:
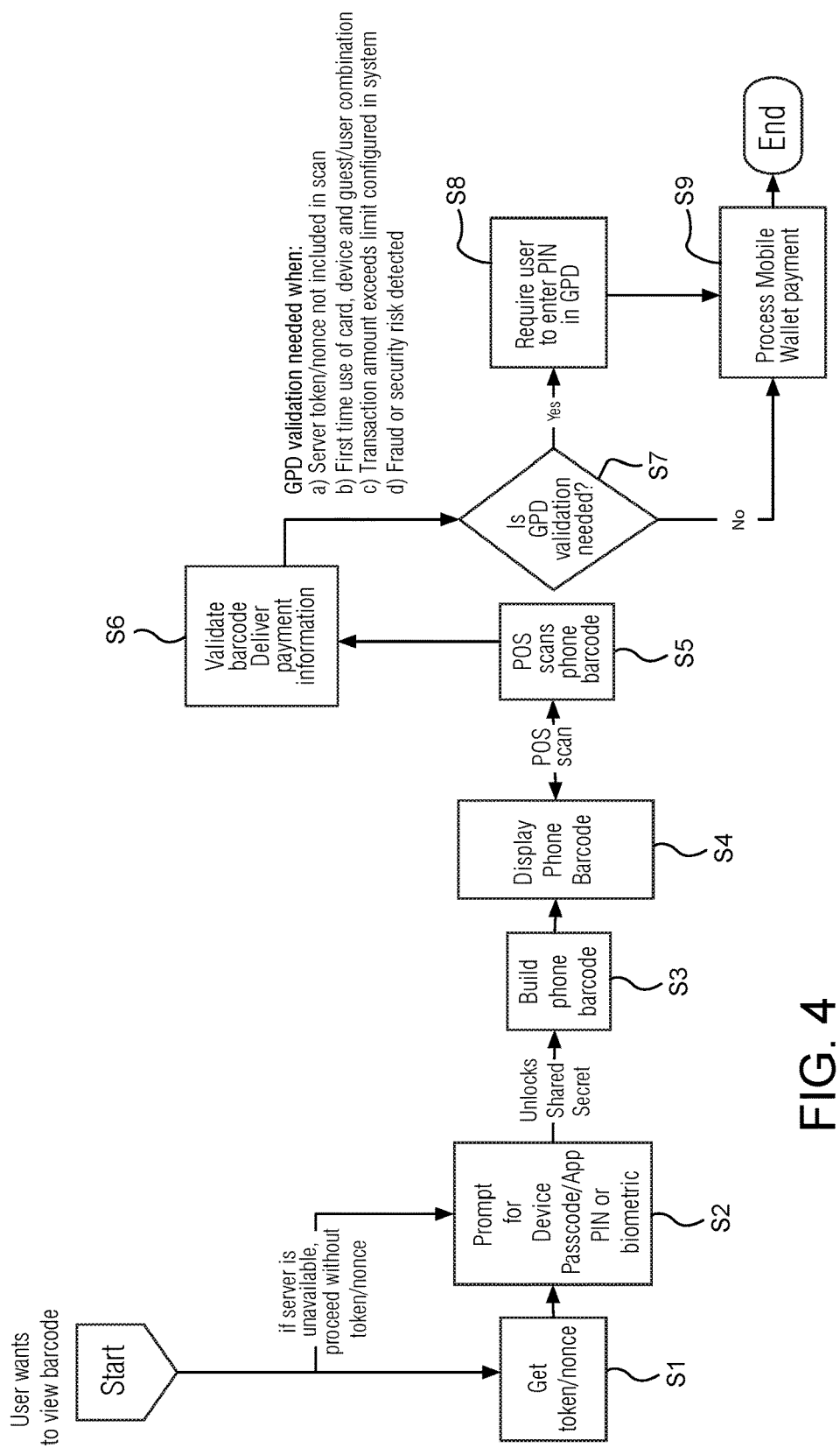
FIG. 4 is a flow diagram of an exemplary process for generating a barcode.

With reference to FIG. 4, when the customer selects the link to generate a barcode to complete a retail transaction, the mobile wallet application requests the customer to enter an application PIN or a passcode for the mobile device (or using Touch ID where appropriate) to retrieve a token/nonce (steps S1-S2). If the mobile device is unable to connect with the server to get the token/nonce, the application will automatically fallback to the local barcode generation. The hash may also include a "salt" or shared secret that is derived by the server when the mobile wallet account is created and stored on the mobile device when the mobile wallet application is linked to the mobile wallet account. The shared secret may be changed periodically by the system. In use, the shared secret is unlocked on the mobile device in step S2. Subsequently, the mobile wallet application builds the local barcode using the hash inputs (step S3), and the local barcode is displayed on the mobile device (step S4).

Subsequently, the local barcode is scanned at the POS terminal (step S5), and the POS terminal accesses the mobile wallet account based on information obtained from the barcode (step S6). In FIG. 4, "GPD" is an acronym for "guest payment device." The POS terminal communicates with the backend server to confirm the validity of the scanned barcode and to process the customer payment using known protocols.

In some embodiments, the mobile wallet application will require the user to enter the card PIN for the payment vehicle (steps S7-S8). This feature is particularly useful when the mobile device is not connected to the network, and the mobile wallet application generates the local barcode 42. Since the mobile device is not connected to the network, certain authentication protocols are unavailable to the mobile wallet application, and requiring the user to enter the card PIN adds a layer of security for ensuring that the customer at checkout is the owner of the card (that is represented with the mobile wallet application) being used. When the PIN entry is validated or if PIN entry is not required, the transaction is authorized (step S9).

In some embodiments, the user may be prompted in steps S7-S8 to enter the card PIN associated with the payment vehicle in other circumstances, regardless of whether the mobile device is connected to a network. For example, the user may be prompted to enter the card PIN when a purchase amount of the user-selected items exceeds a predetermined amount. In another example, the user may be required to enter the card PIN associated with the payment vehicle when a security risk is detected.

As noted, if the barcode is not processed at the POS terminal within a predefined time limit, the system prevents the POS terminal from processing the payment. Additionally, the system checks to determine whether the barcode has been previously used for payment processing, and if so, the system prevents the POS terminal from processing the payment. As an additional security feature, in some embodiments, the system may include provisions to modify the shared secret when a security risk is detected, after a predefined duration or after a predefined number of local barcode transactions.

Figure 5:
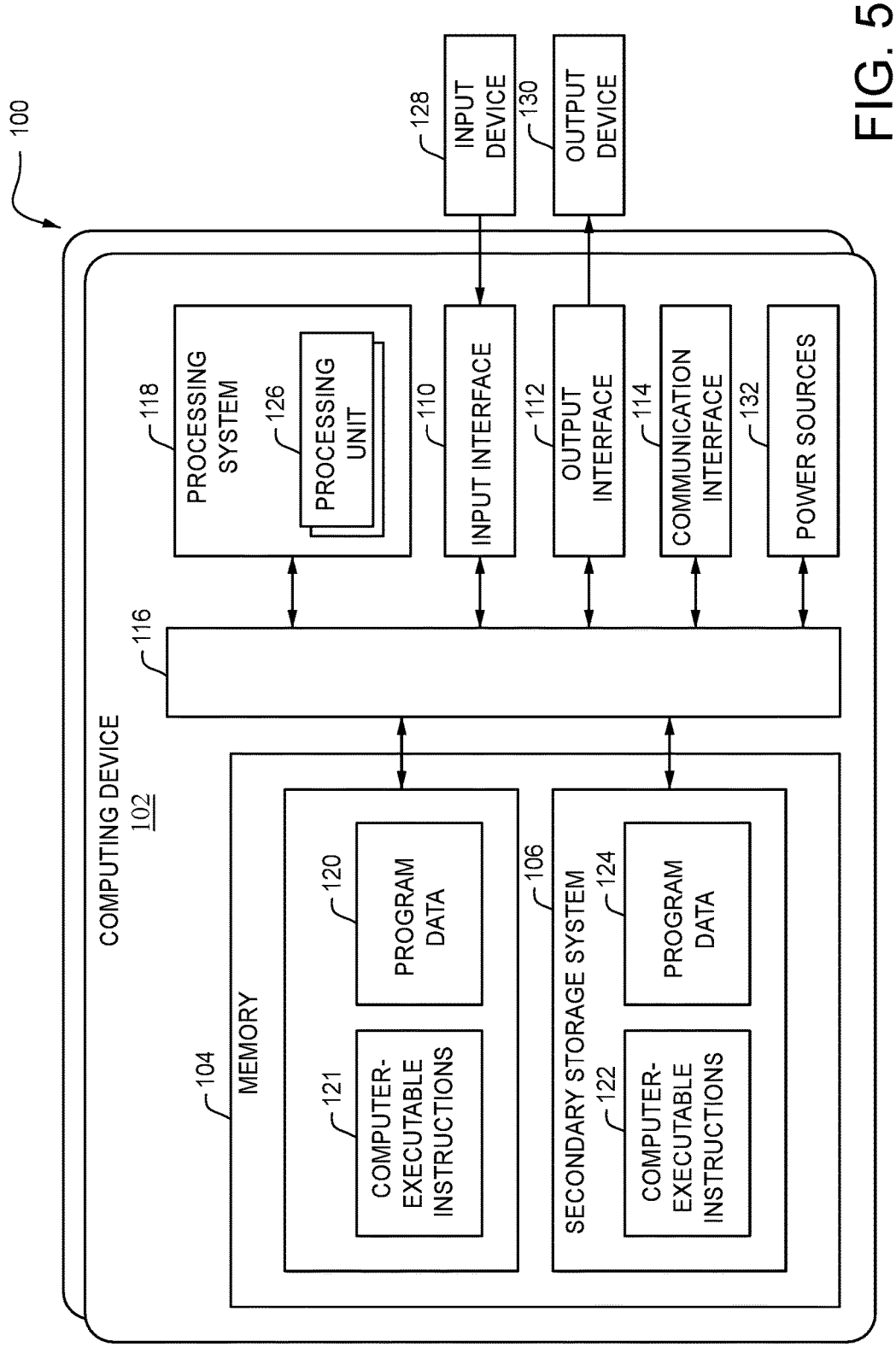
FIG. 5 is a block diagram of an exemplary configuration of a computer system in which the techniques of the described embodiments may be implemented.

In some applications, the mobile wallet account and the mobile wallet application are administered using a computer system. Any known computer configuration capable of carrying out the intended functionality of the preferred embodiments may be used. FIG. 5 is a block diagram of an example configuration of a computer system 100 in which the techniques of this disclosure may be implemented. In the example of FIG. 5, computer system 100 comprises a computing device 102 and one or more other computing devices. Computer system 100 or similar computing systems implement the mobile wallet system 10. Computing device 102 is an electronic device that processes information. In the example of FIG. 5, computing device 102 comprises a data storage system 104, a memory 108, a secondary storage system 106, a processing system 118, an input interface 110, an output interface 112, a communication interface 114, one or more power sources 132, and one or more communication media 116. Communication media 116 enable data communication between processing system 118, input interface 110, output interface 112, communication interface 114, memory 108, and secondary storage system 106. Computing device 102 can include components in addition to those shown in the example of FIG. 5. Furthermore, some computing devices do not include all of the components shown in the example of FIG. 5. Each of components 104, 106, 108, 110, 112, 114, 116, 118, 120, 121, 122, 124, 126, 128, 130, and 132 can be interconnected (physically, communicatively, or operatively) for inter-component communications.

Data storage system 104 is a system that stores data for subsequent retrieval. In the example of FIG. 5, data storage system 104 comprises memory 108 and secondary storage system 106. Memory 108 and secondary storage system 106 store data for later retrieval. In the example of FIG. 5, memory 108 stores computer-executable instructions 121 and program data 120. Secondary storage system 106 stores computer-executable instructions 122 and program data 124. Physically, memory 108 and secondary storage system 106 each comprise one or more computer-readable storage media.

A computer-readable medium is a medium from which a processing system can read data. Computer-readable media include computer storage media and communications media. Computer storage media can further include physical devices that store data for subsequent retrieval. Computer storage media are not transitory. For instance, computer storage media do not exclusively comprise propagated signals. Computer storage media include volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, electrically-erasable programmable read-only memory (EEPROM), programmable read-only memory (PROM), magnetic tape drives, magnetic disks, and other types of devices that store data for subsequent retrieval. Communication media includes media over which one device can communicate data to another device. Example types of communication media include communication networks, communications cables, wireless communication links, communication buses, and other media over which one device is able to communicate data to another device.

Referring again to FIG. 5, processing system 118 is coupled to data storage system 104. Processing system 118 reads computer-executable instructions (e.g., 121, 122) from data storage system 104 and executes the computer-executable instructions. Execution of the computer-executable instructions by processing system 118 configures and/or causes computing device 102 to perform the actions indicated by the computer-executable instructions. For example, execution of the computer-executable instructions by processing system 108 can configure and/or cause computing device 102 to provide Basic Input/Output Systems (BIOS), operating systems, system programs, application programs, or can configure and/or cause computing device 102 to provide other functionality.

Processing system 118 reads the computer-executable instructions from one or more computer-readable media. For example, processing system 118 reads and executes computer-executable instructions 121 and 122 stored on memory 108 and secondary storage system 106.

Processing system 118 comprises one or more processing units 126. Processing units 126 comprise physical devices that execute computer-executable instructions. Processing system 118 can also include one or more operating systems that are executable by computing device 102. Processing units 126 comprise various types of physical devices that execute computer-executable instructions. For example, one or more of processing units 126 comprise a microprocessor, a processing core within a microprocessor, a digital signal processor, a graphics processing unit, or another type of physical device that executes computer-executable instructions.

Input interface 110 enables computing device 102 to receive input from an input device 128. Input device 128 comprises a device that receives input from a user. Input device 128 comprises one or more various types of devices that receive input from users. For example, input device 128 comprises a keyboard, a touch screen, a mouse, a microphone, a keypad, a joystick, a brain-computer interface device, or another type of device that receives input from a user. In some examples, input device 128 is integrated into a housing of computing device 102. In other examples, input device 128 is outside a housing of computing device 102.

Output interface 112 enables computing device 102 to output information on one or more output devices 130. One or more output devices 130, in some examples, are configured to provide output to a user using tactile, audio, or video output. For example, an output device 130 is a device that displays output. Example types of display devices include monitors, touch screens, display screens, televisions, and other types of devices that display output. In some examples, output device 130 is integrated into a housing of computing device 102. In other examples, output device 130 is outside a housing of computing device 102. Output devices 130, in one example, includes a presence-sensitive screen or a touch screen. Output devices 130 can utilize a sound card, a video graphics adapter card, or any other type of device for converting a signal into an appropriate form understandable to humans or machines. Additional examples of output device 130 include a speaker, a cathode ray tube (CRT) monitor, a liquid crystal display (LCD), or any other type of device that can generate intelligible output to a user.

Communication interface 114 enables computing device 102 to send and receive data over one or more communication media. In some examples, computing device 102 utilizes one or more communication interfaces 114 to wirelessly communicate with an external device such as server device or a client device, a mobile phone, or other networked computing device. Communication interface 114 comprises various types of devices. For example, communication interface 114 comprises a Network Interface Card (NIC), a wireless network adapter, a Universal Serial Bus (USB) port, or another type of device that enables computing device 102 to send and receive data over one or more communication media. In some examples, communications interface 114 comprises a network interface to communicate with external devices via one or more networks, such as one or more wireless networks. Examples of communications interface 114 are an Ethernet card, an optical transceiver, a radio frequency transceiver, or any other type of device that can send and receive information. Other examples of such network interfaces include Bluetooth®, 3G and Wi-Fi® radios in mobile computing devices. In some examples, communication interface 114 receives configuration data, trial data, and/or other types of data as described above. Furthermore, in some examples, communication interface 114 outputs information and/or other types of data as described above.

Computing device 102, in some examples, includes one or more power sources 132, which may be rechargeable and provide power to computing device 102. In some examples, the one or more power sources 132 are one or more batteries. The one or more batteries could be made from nickel-cadmium, lithium-ion, or any other suitable material. In another example, the one or more power sources 132 include a power supply connection that receives power from a power source external to computing device 102.

The techniques described herein may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described herein may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of conducting a secure retail transaction using a mobile device, the method comprising:
   (a) receiving personal information and payment information from a user to establish a mobile wallet account, and storing the personal information and payment information in a server computer separate from the mobile device;
   (b) associating a mobile wallet application downloaded to the mobile device with the mobile wallet account;
   (c) providing a link in the mobile wallet application for the user to request the mobile wallet application to generate a barcode for an impending retail transaction;
   (d) processing user-selected items for purchase at a point-of-sale (POS) terminal;
   (e) the mobile wallet application generating the barcode in response to the user selecting the link in step (c) and displaying the barcode on a display of the mobile device, the barcode identifying the mobile wallet account associated with the user;
   (f) scanning the barcode at the POS terminal; and
   (g) the POS terminal accessing the mobile wallet account based on information decrypted from the barcode and processing a payment for the user-selected items,
   wherein step (e) is practiced by generating a server barcode when the mobile device is connected to a network and by generating a local barcode when the mobile device is not connected to a network.

2. A method according to claim 1, wherein step (a) is practiced by receiving a card personal identification number (PIN) from the user that is associated with the payment information.

3. A method according to claim 2, wherein, prior to the step of generating the local barcode when the mobile device is not connected to a network, the method comprises requiring the user to enter the card PIN.

4. A method according to claim 2, wherein, prior to step (e), the method comprises requiring the user to enter the card PIN when a purchase amount of the user-selected items exceeds a predetermined amount.

5. A method according to claim 2, wherein, prior to step (e), the method comprises requiring the user to enter the card PIN when a security risk is detected.

6. A method according to claim 1, further comprising, prior to step (g), determining whether step (e) was practiced within a predefined time limit, wherein when the predefined time limit has expired, the method comprises preventing the POS terminal from processing the payment.

7. A method according to claim 1, further comprising, prior to step (g), determining whether the barcode has been previously used for payment processing, wherein when the barcode has been previously used for payment processing, the method comprises preventing the POS terminal from processing the payment.

8. A method according to claim 1, wherein, prior to step (b), the method comprises generating a shared secret and associating the shared secret with the mobile wallet account, and wherein step (b) is practiced by storing the shared secret on the mobile device.

9. A method according to claim 8, wherein step (e) is practiced by generating the local barcode using a hash incorporating the shared secret.

10. A method according to claim 9, wherein step (g) is practiced by identifying the user with the local barcode and accessing the payment information associated with the mobile wallet account.

11. A method according to claim 8, further comprising modifying the shared secret when a security risk is detected.

12. A mobile wallet system for conducting secure transactions using a mobile device, the mobile wallet system comprising:
   a server computer running a server program;
   an account module residing on the server computer that defines parameters for a mobile wallet account, the account module storing personal information and payment information from a user;
   an application module residing on the server computer that defines a mobile wallet application for download to a mobile device having a display, the server computer linking the mobile wallet application with the mobile wallet account, where the mobile wallet application is configured to provide a link for the user to request the mobile wallet application to generate a barcode for an impending retail transaction; and
   a point-of-sale (POS) terminal interconnected with the server computer over a global network, the POS terminal including a scanner for processing user-selected items for purchase,
   wherein the mobile wallet application is configured to display a barcode in response to the user selecting the link, the barcode comprising data structure that identifies the mobile wallet account associated with the user,
   wherein the POS terminal is configured to access the mobile wallet account based on information decrypted from the barcode and to process a payment for the user-selected items,
   wherein the mobile wallet application is configured to request the server computer to generate the barcode as a server barcode when the mobile device is connected to a network, and wherein the mobile wallet application is configured to generate the barcode as a local barcode different from the server barcode, when the mobile device is not connected to a network.

13. A mobile wallet system according to claim 12, wherein the payment information comprises a card personal identification number (PIN) from the user that is associated with a payment source.

14. A mobile wallet system according to claim 13, wherein when the mobile device is not connected to a network, the mobile wallet application is configured to require the user to enter the card PIN.

15. A mobile wallet system according to claim 12, wherein the barcode comprises a predefined time limit, and wherein when the predefined time limit has expired, the computer server is configured to prevent the POS terminal from processing the payment.

16. A mobile wallet system according to claim 12, wherein the computer server is configured to generate a shared secret and associate the shared secret with the mobile wallet account, the computer server being configured to cause the shared secret to be stored on the mobile device.

17. A mobile wallet system according to claim 16, wherein the local barcode is defined using a hash incorporating the shared secret.

18. A mobile wallet system according to claim 17, wherein the local barcode comprises data structure that identifies the user and enables the computer server to access the payment information associated with the mobile wallet account.

19. A mobile wallet system according to claim 16, wherein the computer server is configured to modify the shared secret when a security risk is detected.

20. A computer system defining for conducting secure transactions using a mobile device, the computer system comprising:
   means for receiving personal information and payment information from a user to establish a mobile wallet account;
   means for storing the personal information and payment information in a server computer separate from the mobile device means for associating a mobile wallet application downloaded to a mobile device with the mobile wallet account;
   means for providing a link in the mobile wallet application for the user to request the mobile wallet application to generate a barcode for an impending retail transaction;
   means for generating the barcode with the mobile wallet application in response to the user selecting the link, and means for displaying the barcode on a display of the mobile device, the barcode identifying the mobile wallet account associated with the user; and
   means for accessing the mobile wallet account based on information decrypted from the barcode and for processing a payment,
   wherein the means for generating the barcode comprises means for generating a server barcode when the mobile device is connected to a network and for generating a local barcode when the mobile device is not connected to a network.

* * * * *